Dec. 6, 1966  R. J. TRNKA  3,289,308
DIAL INDICATOR PLUG GAUGE
Filed April 30, 1962  2 Sheets-Sheet 1
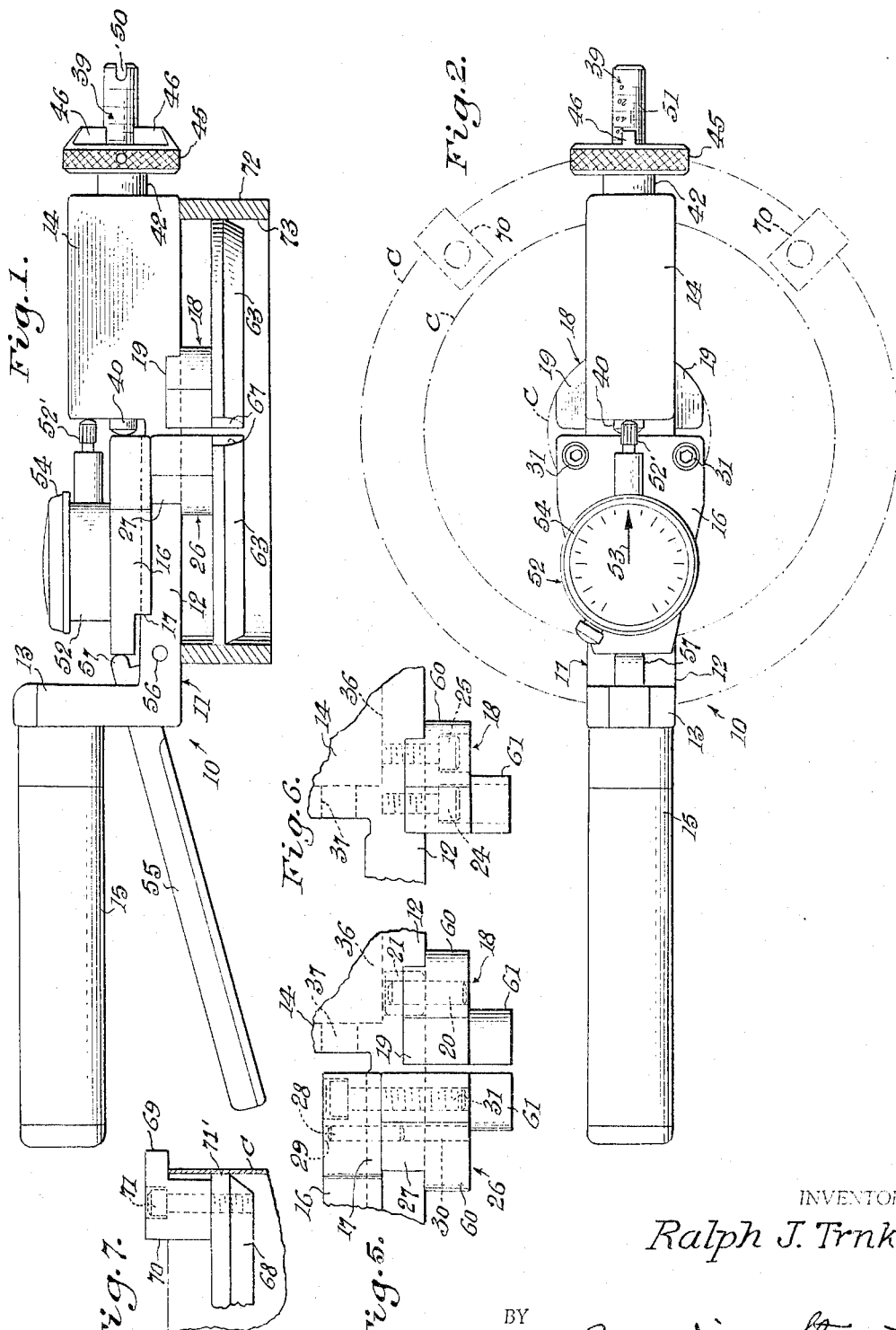
INVENTOR
Ralph J. Trnka
BY
Mason, Porter, Diller & Stewart
ATTORNEYS

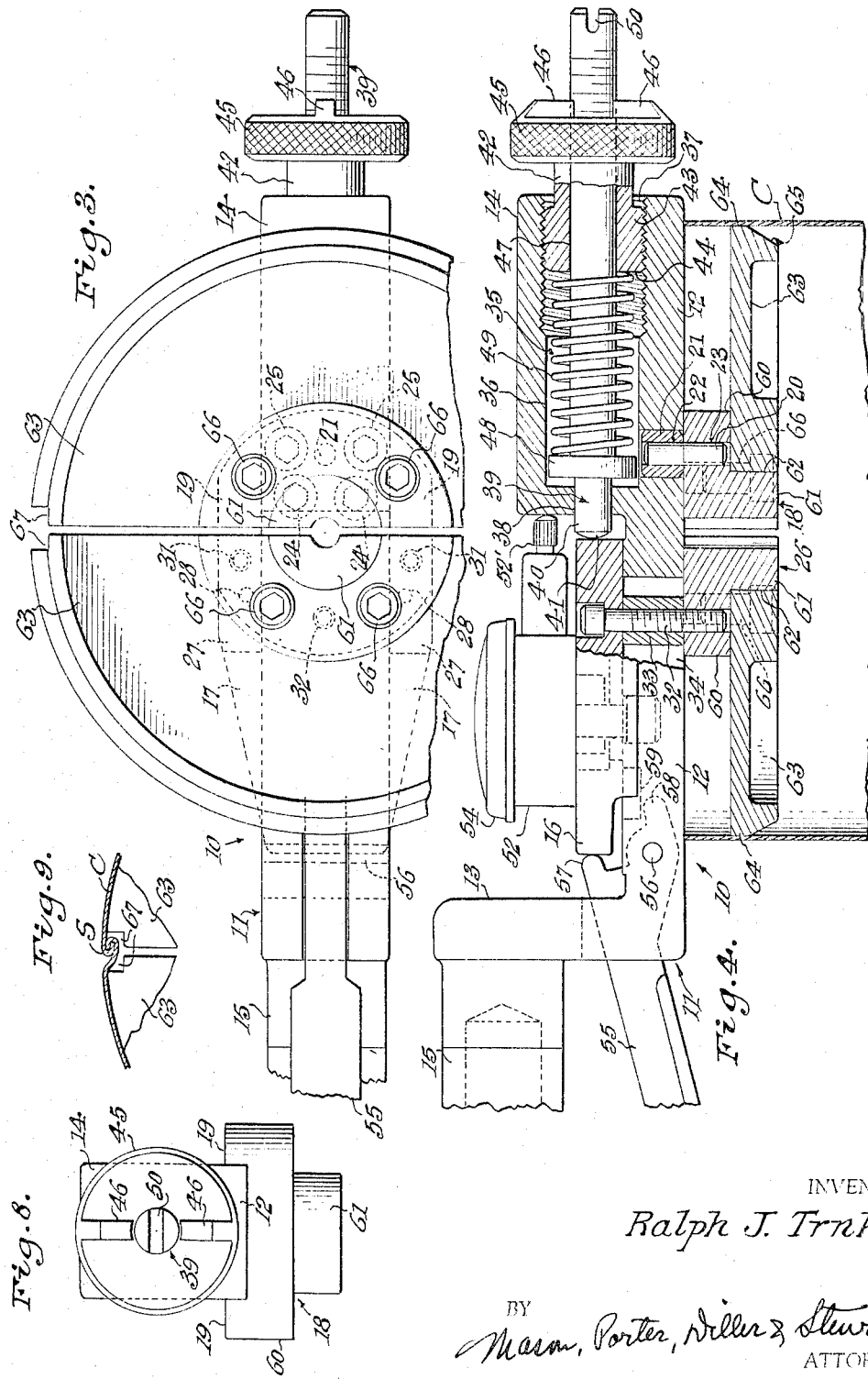

United States Patent Office 3,289,308
Patented Dec. 6, 1966

3,289,308
DIAL INDICATOR PLUG GAUGE
Ralph J. Trnka, Chicago, Ill., assignor to Continental Can Company, Inc., New York, N.Y., a corporation of New York
Filed Apr. 30, 1962, Ser. No. 190,964
10 Claims. (Cl. 33—147)

This invention relates in general to new and useful improvements in gauging devices and more particularly to a dial indicator plug gauge.

This invention is particularly directed to a plug gauge which may be utilized in gauging the internal diameters of thin walled articles, such as a container, but is readily adaptable to use in gauging the internal diameters of other types of articles.

A thin walled article, such as a container body, normally is out of round and must be reshaped during the gauging operation. It is, therefore, a primary object of this invention to provide a novel plug gauge for measuring internal diameters of thin walled articles wherein the gauging elements of the plug gauge will exert pressure on the article being gauged of such a force so as to reshape the article to its original predetermined shape.

Another object of this invention is to provide a novel plug gauge particularly adapted for gauging thin walled articles, the plug gauge including a basic gauge structure which is provided with a plurality of removable plug segments whereby the same basic gauge structure may be utilized in gauging a plurality of different sizes of articles.

Another object of this invention is to provide a novel plug gauge which includes a base having a slide mounted therein for movement relative thereto, a fixed plug element carried by the base and a movable plug element carried by the slide in association with the fixed plug element, the base being provided with spring means loading the slide to urge the movable plug element away from the fixed plug element to a gauging position, and there being a dial indicator disposed between the slide and the base to indicate the relative movement of the movable plug element with respect to the fixed plug element.

Still another object of this invention is to provide a plug gauge particularly adapted to gauge the internal diameters of a plurality of different sizes of articles, the plug gauge including gauge segments which are removable and replaceable in accordance with the diameter of the article to be gauged and wherein the plug segments for large diameter articles are provided with flanges to effect the supporting of the gauge on the article during the gauging operation.

A further object of this invention is to provide a novel plug gauge wherein there is a fixed plug element and a movable plug element, and spring means for exerting a predetermined pressure through the plug elements during the gauging operation, the gauge further including a dial indicator which has a zero setting and showing plus and minus readings on opposite sides of the zero setting whereby once the gauge has been set, it may be utilized in gauging articles with the dial indicator gauging direct readings.

Yet another object of this invention is to provide a novel spring unit for use in gauging devices or other devices wherein a predetermined spring load is to be applied, the spring unit including a housing having a plunger extending therethrough, an adjustable member adjustably carried by the housing and receiving an intermediate portion of the plunger, a spring on the plunger clamped between a shoulder of the plunger and the adjustable member, and cooperating indicator means on the plunger and the adjustable member for indicating the pressure exerted by the spring on the plunger.

A still further object of this invention is to provide a novel method of gauging thin walled articles subject to deformation and being reshapeable under pressure, the method including the use of a spring loaded gauge and involving the initial setting of the gauge under pressure within a set-up ring of a known desired diameter and under the operating pressure of the gauge, after which the gauge is placed within the article to be gauged and an indication of the variants of the diameter of the article being tested from the norm being directly indicatable by reading a dial indictaor on the gauge.

With the above, and other objects in view that will hereinafter appear, the nature of the invention will be more clearly understood by reference to the following detailed description, the appended claims and the several views illustrated in the accompanying drawings:

In the drawings:

FIGURE 1 is a side elevational view of the plug gauge and shows the same in conjunction with a master ring for setting the gauge, the master ring being shown in section.

FIGURE 2 is a plan view of the gauge of FIGURE 1 and shows further the details thereof, the various diameters of the cans readily gauged utilizing the gauge being shown in phantom lines.

FIGURE 3 is a partial fragmentary plan view of the plug gauge and shows more specifically the details of mounting of the plug elements of the removable plug segments carried thereby.

FIGURE 4 is an enlarged fragmentary elevational view similar to FIGURE 1 with portions of the plug gauge being broken away and shown in section to more clearly illustrate the details thereof, the plug gauge being shown in engagement with a can during a gauging operation.

FIGURE 5 is an enlarged fragmentary elevational view of the plug gauge with the main components of the spring unit being omitted and particularly shows additional features of the mounting of the plug elements.

FIGURE 6 is an enlarged fragmentary side elevational view of the gauge, the view being similar to FIGURE 5 and showing more specifically the details of the mounting of the fixed gauge element.

FIGURE 7 is a fragmentary vertical sectional view taken through a thin walled member wherein the member is of a large diameter as compared to the plug gauge and wherein one of the plug gauge segments is provided with a flange resting upon the upper edge of the article being gauged to effect the supporting of the gauge during the gauging operation.

FIGURE 8 is a fragmentary end view of the gauge taken from the spring unit end thereof and shows more specifically the details of the means for adjusting the pressure exerted by the spring unit of the gauge.

FIGURE 9 is a fragmentary horizontal sectional view through a container body and shows the manner in which the plug segments are provided with recesses for receiving the seam of the container body.

Referring now to the drawings in detail, the plug gauge, which is the subject of this invention, is generally referred to by the numeral 10. The plug gauge 10 includes a body, generally referred to by the numeral 11. The body 11 is preferably of a one-piece construction and has an elongated base 12 which is provided at the left end thereof, as viewed in FIGURE 1, with an upstanding flange 13. The right end of the base 12 is provided with an integral block or housing 14. A suitable handle 15 is secured to the flange 13 and extends away from the body 11 to facilitate the handling of the plug gauge 10.

A slide 16 is mounted on the base 12 between the flange 13 and the housing 14 for sliding movement thereon. The slide 16 overlies the base 12 and is clamped against the upper surface thereof. As is best shown in FIGURE 1, the underside of the slide 16 is recessed to receive the upper portion of the base 12 with the recessing of the slide 16 forming two side flanges 17 which serve to prevent transverse movement of the slide 16 relative to the base 12.

A fixed plug element, which is generally referred to by the numeral 18, is secured to the underside of the base 12. The plug element 18 has a recessed upper central portion to receive the base 12 with the recessing of the plug element 18 forming a pair of flanges 19 which engage opposite sides of the base 12, as is shown in FIGURE 2, to initially position the plug element 18 on the base 12.

The plug element 18 is accurately positioned on the base 12 by means of a pin 20, as is best shown in FIGURE 4. The base 12 has an accurately positioned plug 21 seated therein below the housing 14 and the upper end of the pin 20 is tightly seated in a bore 22 of the plug 21. The lower end of the pin 20 is seated in a bore 23 in the plug element 18.

As is best shown in FIGURES 3 and 6, the plug element 18 is clamped in place against the underside of the base 12 by means of two pairs of fasteners 24 and 25. The fasteners 24 and 25 are of the cap screw type and pass upwardly through the plug element 18 and are threaded into the base 12. It is to be noted that the heads of the fasteners 24 and 25 are recessed within the plug element 18.

A movable plug element 26 is carried by the slide 16 for movement therewith. The movable plug element 26 has a configuration which is very similar to that of the plug element 18. Like the plug element 18, the upper surface of the plug element 26 is recessed to define a pair of flanges 27 disposed on opposite sides of the base 12 whereby the plug element 26 is positioned on the base 12 for movement thereon in a longitudinal direction only. It is to be noted that the combined heights of the flanges 17 and 27 correspond substantially to the thickness of the base 12 with the flanges 17 and 27 being in abutment.

The plug element 26 is accurately positioned relative to the slide 16 by means of a pair of pins 28 which are disposed in aligned bores 29 and 30 formed in the slide 16 and the plug element 26, respectively. It is to be noted that the bores 29 and 30 are formed in the flanges 17 and 27.

The plug element 26 is releasably clamped to the slide 16 by means of a pair of bolts 31 which pass down through the flanges 17 of the slide 16 and are threaded into the flanges 27 of the plug element 26. The plug element 26 is further secured to the slide 16 by means of a centrally located bolt 32, as is shown in FIGURES 3 and 4. The bolt 32 passes through a sleeve 33 so as to restrict the clamping of the base 12 between the slide 16 and the plug element 26. The sleeve 33 is disposed in a longitudinally extending recess 34 extending entirely through the base 12 and opening out through the flange 13. It will thus be apparent that the plug element 18 is fixed to the base 12 while the plug element 26 is movable relative to the base 12 with the slide 16.

In order to effect the engagement of the gauging elements, such as the plug elements 18 and 26, of the plug gauge 10 with an article being gauged under pressure, the body 11 is provided with a spring unit, generally referred to by the numeral 35. The spring unit 35 is carried by the housing 14. The housing 14, as is clearly shown in FIGURE 4, has a large diameter bore 36 therein. The bore 36 opens through the right end of the housing 14 and includes a right-hand internally threaded portion 37. The left end of the bore 36 is reduced, as at 38, and opens out through the housing 14.

A plunger 39 extends through the housing 14 and projects out of the opposite ends thereof. The plunger 39 has a left end portion, as viewed in FIGURE 4, which extends through the reduced bore portion 38 in guided relation. The left end portion 40 of the plunger 39 terminates in a rounded end 41 which abuts the slide 16.

An adjusting sleeve 42 is mounted in the right end of the housing 14 and includes an enlarged left-hand portion 43 which is threadedly engaged with the threads 37 so as to adjustably position the sleeve 42 relative to the housing 14. The left-hand portion 43 terminates at the left end thereof in an abutment end 44. The right end of the sleeve 42 carries and enlarged grip portion 45 to facilitate the rotation thereof so as to adjust the position of the sleeve 42 with respect to the housing 14. The right face of the grip portion 45 is provided with a pointer 46.

The sleeve 42 has a bore 47 therethrough in which the plunger 39 is tightly received for guidance and at the same time permits reciprocatory movement of the plunger 39 relative to the sleeve 42 and the rotation of the sleeve 42 relative to the plunger. The plunger 39 is, accordingly, effectively supported by the housing 14 within the bore 38 and by the sleeve 42 within the bore 47. A collar 48 is carried by the left-hand portion of the plunger 39 within the housing 14. A spring 49 is telescoped over the plunger 39 to the right of the collar 48 and has the opposite ends thereof abutting the collar 48 and the abutment end 44 of the sleeve 42 with the spring 49 being clamped therebetween to vary the tension of the spring 49 and the force exerted thereby through the plunger 39.

The right end of the plunger 39 is provided with a screw driver slot 50 to prevent the rotation of the plunger 39 when the sleeve 42 is being adjusted. By adjusting the position of the sleeve 42, the effective pressure exerted by the plunger 39 may be varied. The right end portion of the plunger 39, as is best shown in FIGURE 2, is provided with indicator means 51 which cooperates with the pointer 46 to indicate the effective pressure of the spring 49 on the plunger 39.

Referring once again to FIGURE 4, it will be seen that the slide 16 carries a conventional dial indicator 52. The dial indicator 52 has a plunger 52' which bears against the housing 14 and transmits the effects of any movement of the sleeve 16 relative to the base 12 to the dial indicator 52. The dial indicator 52, as is best shown in FIGURE 2, is direct reading and includes a pointer 53 and a dial 54. The dial 54 is of the type having a central zero point whereby plus and minus readings with respect to a reference zero may be obtained. The dial 54 is rotatable with respect to the remainder of the dial indicator 52, in a conventional manner, so that the dial 54 may be set to a zero position when desired.

A lever 55 underlies the handle 15 and is pivotally mounted within the recess 34 for swinging about a transverse horizontal pivot pin 56. The lever 55 has a pin portion 57 which is engageable with the left-hand end of the slide 16 so as to prevent movement of the slide 16 to the left by the spring unit 35. Thus, by utilizing the lever 55, the slide 16 may be moved towards a central position against the urging of the spring 49 to facilitate the positioning of the plug elements 18 and 26 within an opening. The lever 55 is also provided with a finger 58 which is normally seated within the recess 34 and which is engageable with a cross bar 59 to limit the downward swinging of the lever 55 away from the handle 15.

It will be readily apparent from FIGURE 4 that when the plug gauge 10 is initially being positioned with respect to an article to be gauged, such as the can body 60 of FIGURE 4, the lever 55 is moved to a position parallel to and directly underlying the handle 15 by simultaneously gripping the handle 15 and the lever 55. This moves the slide 16 to the right, as viewed in FIGURE 4, against the urging of the spring 49 to the left. When the lever 55 is gradually released, the spring 49 will move the slide 16 to the left, as viewed in FIGURE 4, so as to move the plug elements apart into gauging contact with the internal surface of the bore being checked. Swinging of the lever 55 away from the handle 15 is limited by engagement of the finger 58 with the strap 59.

The plug elements 18 and 26 have upper gauging surfaces 60 which are preferably of the same radius as the bore of the smallest article to be gauged utilizing the plug gauge 10. The plug elements 18 and 26 also have inwardly offset lower portions 61 having outer cylindrical surfaces 62 which, if desired, could conform in curvature to a still smaller diameter of bores which may be gauged utilizing the plug gauge 10.

In the use of the plug gauge 10, the plug elements 18 and 26 are moved together so that the plug elements may be moved into the article to be checked. The surfaces 60 of the plug elements 18 and 26 will then engage the article and form the necessary gauging surface.

Although gauging of articles can be carried out utilizing the plug elements 18 and 26 through engagement with the article being checked, under most circumstances, plug segments 63 will be utilized. The plug segments 63 will be of sizes to be received in respective articles to be checked and are replaceable. Each plug element has an outer cylindrical surface 64, which constitutes the gauging surface, and a lower tapered surface 65 to facilitate the insertion of the plug segments 63 into an article to be tested, such as the can body 60.

The plug segments 63 are releasably secured to the plug elements 18 and 26 by means of removable bolts 66.

Reference is now made to FIGURE 3 wherein it is to be noted that corners of the plug segments 63 are notched as at 67 to provide for clearance of an internal projection within the article being checked. As is shown in FIGURE 9, a can body, such as the can body C, is customarily provided with a seam S which projects into the interior thereof. The notching of the plug segments 63, as at 67, provides the necessary clearance for the seam S.

Referring once again to FIGURE 4, it will be seen that when the plug gauge 10 is used to gauge articles within a limited range, the plug gauge base 12 will seat on the articles and the plug gauge is thus supported thereby. However, when larger diameter articles are being gauged than those which will bear fully against the base 11, it is desirable to provide the plug segments, such as the plug segments 68 shown in FIGURE 7, with a supporting flange 69. The supporting flange 69 is part of a L-shaped support 70 which is secured to the plug segments 68 by means of a fastener 71. The height of the L-shaped support 70 is made such to position a gauging surface 71' of the gauge segments 68 at the desired depth within the article being gauged.

OPERATION

Reference is made to FIGURE 1 wherein a master ring 72 is shown. The master ring 72 has an inner surface 73 which corresponds directly to the surface to be gauged. In FIGURE 1 the plug gauge 10 is provided with the plug segments 63.

The plug gauge 10 is gripped by the handle 15 with the hand gripping the handle 15 also gripping the lever 55 and pulling the same upwardly so as to urge the plug element 26 toward the plug element 18 and in this manner pulling together the plug segments 63. The base 12 is seated on the master ring 72, as is shown in FIGURE 1, after which the lever 55 is released. The spring unit 35, through the plunger 39, now moves the slide 16 to the left, to be urging the plug segments 63 apart and into engagement with the surface 73 of the master ring 72. The pressure of the spring unit 35 is then read from the indicator means 51 on the right end of the plunger 39 and if the pressure is not that required for the particular article to be checked, then the pressure is set by rotating the sleeve 42 utilizing the grip portion 45 and determining the pressure by the position of the pointer 46 on the indicator means 51.

After the pressure of the spring unit 35 has been properly set, the dial 54 of the dial indicator 52 is rotated so that the zero position thereof is aligned with the pointer 53. The plug gauge 10 is now ready to be utilized in gauging an article, such as the can body C.

With respect to the pressure to which the spring unit 35 is to be set, it is to be understood that this pressure varies in accordance with the thickness of the material from which the can body C, for example, is formed. Can body stock comes in what is generally referred to as a base box with the thickness of the material being referred to by the weight of the base box. Normally, the thickness of the material in tens of thousands of an inch is determined by the weight of a base box multiplied by 11. For example, 80 pound base box metal has a thickness of .0088 inch. It has been found in the use of the plug gauge 10 that the pressure of the spring unit will be the base box weight minus five pounds.

After the plug gauge 10 has been initially set, it is released from the master ring 72 by first pulling up on the lever 55 to move the plug segments 63 out of engagement with the surface 73 of the master ring 72, after which the plug gauge 10 is free to be lifted clear of the master ring 72.

The plug gauge, with the lever 55 in its up position, is then positioned on a can body, such as the can body C, in the manner shown in FIGURE 4. The lever 55 is released and the spring unit 35 serves to move the plug segments 63 apart. Normally, the can body C is not perfectly round due to the fact that it is unsupported at the end being gauged and the plug segments 63 serve to reshape the can body C to its circular cross section. In this manner, a true gauging of the can body can be obtained.

If the can body C has an internal diameter in accordance with the master ring 72, then the pointer 53 of the dial indicator 52 will be at the zero position. On the other hand, if the can body is either of a smaller or larger diameter, the pointer 53 will swing from the zero position and indicate the oversize or undersize of the can body.

Although the plug gauge 10 is particularly adapted for checking can bodies and other thin walled cylindrical articles, it is to be understood that the plug gauge could also be used in conjunction with rigid wall articles.

The spring unit 35 has also proven to be useful in conjunction with other types of gauges besides the plug gauge 10. It is not necessary that the housing 14 which carries the spring unit 35 be integrally formed with the base 12, and the housing 14 could be suitably separately mounted in any desired manner in conjunction with other devices which are to be spring loaded and wherein an accurate determination of the spring pressure is desired.

Although a preferred embodiment of the invention has been illustrated and described, it is to be understood that minor modifications may be readily made in the invention within the spirit and scope thereof, as defined by the appended claims.

I claim:

1. A plug gauge for checking the internal diameters of thin walled objects such as containers, said gauge comprising a base, a slide mounted on said base, a fixed plug element carried by said base, a movable plug element carried by said slide for movement therewith away from said fixed plug element, said plug elements being generally semicircular in outline and having a peripheral surface of a radius corresponding to the radius of the object to be gauged, a spring unit urging said slide to move said movable plug element away from said fixed plug element and a dial indicator between said base and said slide for indicating the position of said movable plug element relative to said fixed plug element, said spring unit including means for adjusting the object reshaping pressure exerted thereby on an object being gauged through said plug elements and said adjusting means including calibrating means for setting a predetermined reshaping puressure in accordance with the object being gauged.

2. A plug gauge for checking the internal diameters of thin walled objects such as containers, said gauge comprising a base, a slide mounted on said base, a depending fixed plug element carried by said base, a depending movable plug element carried by said slide for movement therewith away from said fixed plug element, said plug elements being generally semicircular in outline and having a peripheral surface of a radius corresponding to the radius of the object to be gauged, a spring unit urging said slide to move said movable plug element away from said fixed plug element and a dial indicator between said base and said slide for indicating the position of said movable plug element relative to said fixed plug element, said spring unit including means for adjusting the object reshaping pressure exerted thereby on an object being gauged through said plug elements said adjusting means including calibrating means for setting a predetermined reshaping pressure in accordance with the objects gauged, and a lever engaged with said slide for moving said slide against the resistance of said spring unit and moving said movable plug element towards said fixed plug element to facilitate the positioning of said plug elements in an article to be gauged.

3. The plug gauge of claim 1 wherein said base has a flat undersurface for engagement with an object being gauged to restrict the penetration of said plug elements into an object being gauged.

4. The plug gauge of claim 1 wherein said plug elements have removable plug segments releasably secured thereto for varying the capacity of said gauge.

5. The plug gauge of claim 1 wherein said plug elements have removable plug segments releasably secured thereto for varying the capacity of said gauge, and larger ones of said removable plug segments have flanges projecting therefrom for engaging and supporting the gauge on articles to be gauged.

6. A plug gauge for checking the internal diameters of thin walled objects such as containers, said gauge comprising a base, a slide mounted on said base, a depending fixed plug element carried by said base, a depending movable plug element carried by said slide for movement therewith away from said fixed plug element, a spring unit urging said slide to move said movable plug element away from said fixed plug element and a dial indicator between said base and said slide for indicating the position of said movable plug element relative to said fixed plug element, said spring unit including a housing, a plunger extending through and out opposite ends of said housing, a shoulder on said plunger adjacent one end thereof and within said housing, a pressure indicating scale on said plunger adjacent the other end thereof and outside of said housing, a sleeve adjustably threaded in said housing and freely receiving said plunger, said sleeve having an abutment end and a pointer at the opposite end thereof, a spring telescoped over said plunger and having opposite ends engaging said shoulder and said abutment end, and said pointer cooperating with said scale to indicate the pressure exerted on said plunger by said spring.

7. A method of gauging internal diameters of thin walled readily deformable articles utilizing a spring loaded plug gauge of the type including a measuring device, said method comprising the steps of setting-up the plug gauge in a master ring, adjusting the tension of the spring of the gauge to a predetermined loading while the plug gauge is in the master ring, and then setting-up the plug gauge in an article to be gauged with the measuring device indicating whatever variation from standard that may exist.

8. A method of gauging internal diameters of thin walled readily deformable articles utilizing a spring loaded plug gauge of the type including a measuring device having an adjustable zero position, said method comprising the steps of setting-up the plug gauge in a master ring, adjusting the tension of the spring of the gauge to a predetermined loading while the plug gauge is in the master ring, setting the measuring device at the zero position thereof, and then setting-up the plug gauge in an article to be gauged with the measuring device indicating whatever variation from standard that may exist.

9. A method of gauging internal diameters of thin walled readily deformable articles utilizing a spring loaded plug gauge of the type including a measuring device, said method comprising the steps of setting-up the plug gauge in a master ring, adjusting the tension of the spring of the gauge to a predetermined loading necessary to exert a shape retaining force on the article to be tested while the plug gauge is in the master ring, and then setting-up the plug gauge in an article to be gauged with the plug gauge exerting a shape retaining force on the article and the measuring device indicating whatever variation from standard that may exist.

10. A method of gauging internal diameters of thin walled readily deformable articles utilizing a spring loaded plug gauge of the type including a measuring device having an adjustable zero position, said method comprising the steps of setting-up the plug gauge in a master ring, adjusting the tension of the spring of the gauge to a predetermined loading necessary to exert a shape retaining force on the article to be tested while the plug gauge is in the master ring, setting the measuring device at the zero position thereof, and then setting-up the plug gauge in an article to be gauged with the plug gauge exerting a shape retaining force on the article and the measuring device indicating whatever variation from standard that may exist.

References Cited by the Examiner

UNITED STATES PATENTS

| 1,062,566 | 5/1913 | Gohlke et al. | 33 |
| 1,863,673 | 6/1932 | Schraven | 33—147 |
| 1,961,368 | 6/1934 | Larson | 73—141 |
| 2,586,245 | 2/1952 | McRae | 177—232 X |
| 2,643,461 | 6/1953 | Wiebe | 33—178 |
| 2,648,134 | 8/1953 | Billeter | 33—147 |
| 2,946,128 | 7/1960 | Caldwell | 33—147 |
| 3,067,520 | 12/1962 | Geraghty | 33—147 |

LEONARD FORMAN, *Primary Examiner.*

ISAAC LISANN, ROBERT B. HULL, *Examiners.*

W. KICE, N. MARTIN, S. S. MATTHEWS,
*Assistant Examiners.*